United States Patent [19]

Astle

[11] Patent Number: 5,526,295
[45] Date of Patent: Jun. 11, 1996

[54] EFFICIENT BLOCK COMPARISONS FOR MOTION ESTIMATION

[75] Inventor: Brian Astle, Phoenix, Ariz.

[73] Assignee: Intel Corporation, Santa Clara, Calif.

[21] Appl. No.: 367,457

[22] Filed: Dec. 30, 1994

[51] Int. Cl.[6] .............................. H04N 7/137; H04N 7/36
[52] U.S. Cl. ............................ 364/715.02; 382/232
[58] Field of Search .................... 382/232, 236; 364/715.02; 358/433; 348/421, 420

[56] References Cited

U.S. PATENT DOCUMENTS 4,797,729  1/1989  Tsai ................................ 358/13
4,821,119  4/1989  Gharavi .......................... 358/136
5,448,310  9/1995  Kopet et al. .................... 348/699
5,481,307  1/1996  Goldstein et al. ............... 348/384

Primary Examiner—Paul P. Gordon
Assistant Examiner—Monica Lewis
Attorney, Agent, or Firm—William H. Murray

[57] ABSTRACT

In a digital video motion estimation compression and decompression system pixel block comparisons are accomplished by eliminating or substantially reducing the DC component of the spatial frequency spectrum of the pixel block data prior to doing comparisons. This allows for accurate and efficient block matching even in situations where the video image temporally fades or brightens, as often occurs in real-world video imaging situations.

26 Claims, 4 Drawing Sheets

ENCODING SYSTEM

FIG. 1 ENCODING SYSTEM

DECODING SYSTEM

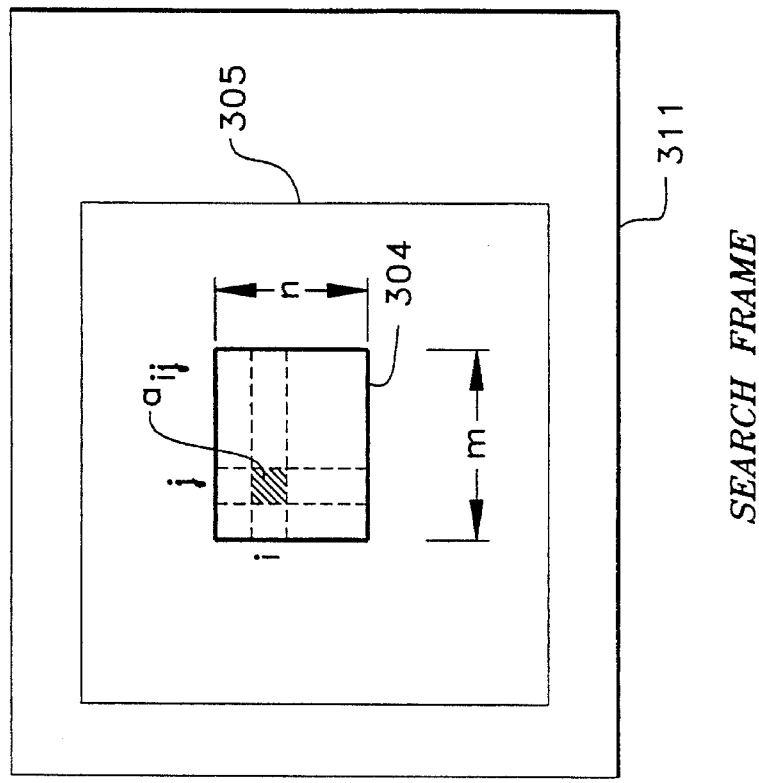
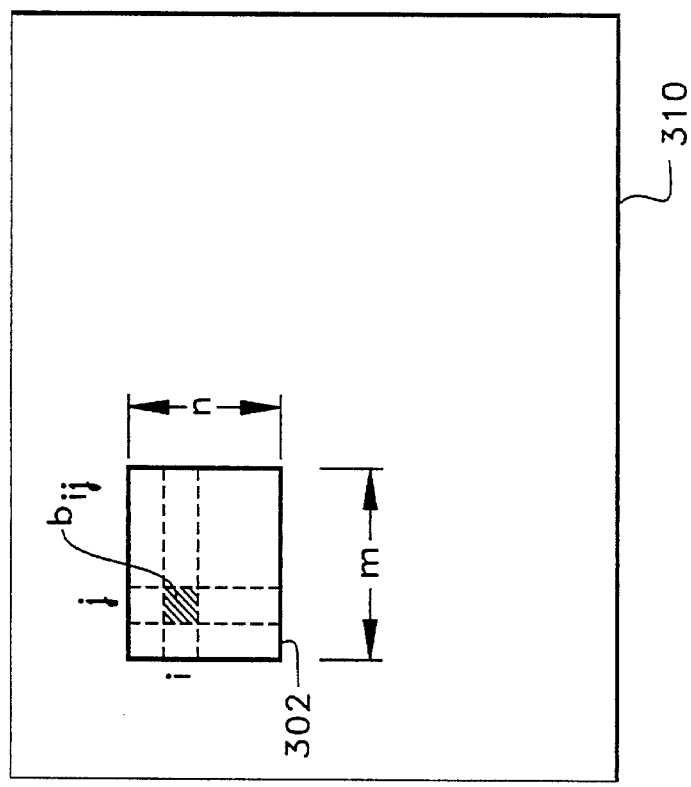
FIG. 3

EFFICIENT BLOCK COMPARISONS FOR MOTION ESTIMATION

BACKGROUND OF THE INVENTION

1. Field of the Invention

The present invention relates to signal processing and, in particular, to computer-implemented processes and apparatus for efficient block comparisons in motion estimation systems.

2. Description of the Related Art

Motion estimation is commonly utilized by video encoders in signal processing techniques that compress successive frames of digital video data ("video frames"). When these video frames are to be transmitted via a communication medium of limited bandwidth, or are to be stored in a storage medium having limited storage capacity, it is often desirable to first compress the digital data which represents each frame, so as to reduce the amount of data that needs to be transmitted.

Motion estimation is one of the most computationally intense of the various techniques utilized to compress data. Motion estimation techniques exploit the temporal correlation that often exists between consecutive video frames, in which there is a tendency for objects or image features to move from one location to another on a display device from frame to frame.

For instance, frame 1 may contain an object, and frame 2 may contain a set of pixels corresponding to the same object spatially displaced by a few pixels from the location in frame 1. If frame 1 is transmitted to and received by a pixel processor or video processor (which performs any necessary decompression or other decoding), frame 2 may be transmitted without including the pixel data corresponding to the object. Instead, motion vectors (i.e. "pointers") are sent along with frame 2 (which may also be compressed using other techniques). These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in frame 2.

The motion estimation procedure may be performed at the encoder level by comparing given regions or blocks within a current video frame to many regions or blocks within the previous video frame. The process of comparing a given block of one frame to a block of another frame is called "block matching." Blocks are matched by determining a "comparison measurement" between any given pair of blocks. A comparison measurement corresponds to some form of indication of a degree of "difference" between the two regions. If the comparison measurement is below a predetermined threshold, the blocks may be considered to be similar enough that a block match is indicated. If so, the block in the previous video frame may be utilized as described above by the video decoder to reproduce a duplicate block in the current video frame.

In performing such comparisons, a large number of pixels from the previous video frame are accessed for each block of the current video frame that is subjected to motion estimation. In most general purpose video processing systems, the bit maps corresponding to the previous and current video frame pixels are stored in general purpose memory connected to the video processor through a bus. For each block matching procedure the video processor must access the memory many times, which may constitute a high amount of traffic on the bus and a high number of memory accesses. Because of the limited bandwidth of the bus by which the memory is accessed, these memory accesses can tie up use of the bus and memory and thus slow down overall operation of the video processing system.

To avoid this problem, the video processor performing the motion estimation step may contain, for example, a dedicated, special-purpose memory space to store the two video frames being compared so that there is less traffic on the bus. However, such a special-purpose memory space is often unavailable, unfeasible, or otherwise not desired because of the extra complexity of such a special-purpose memory. The special-purpose memory space may be too costly. Further, even a special purpose memory space may be accessed so often during block matching that the video processor may be slowed down.

It is accordingly an object of this invention to overcome the disadvantages and drawbacks of the known art and to provide a method and apparatus that more efficiently uses available data to perform accurate block matching.

Further objects and advantages of this invention will become apparent from the detailed description of a preferred embodiment which follows.

SUMMARY

The previously-mentioned objectives are fulfilled with the present invention. There is provided herein a novel computer-implemented method for efficient and accurate block matching. According to a preferred embodiment of the invention, a plurality of search blocks is selected in accordance with the location of a reference block of a current frame. A plurality of words corresponding to the plurality of search blocks is read from a memory device. A comparison measurement for each search block of the plurality of search blocks with respect to the reference block is determined from the plurality of words and from the reference block, in a manner that gives special weight to the middle and higher spatial frequency components of the spatial frequency spectrum thereof in determining the degree of variation between the respective blocks.

BRIEF DESCRIPTION OF THE DRAWING

These and other features, aspects, and advantages of the present invention will become more fully apparent from the following description, appended claims, and accompanying drawings in which:

FIG. 3 depicts reference and search frames having reference and search blocks and a search area utilized in motion estimation by the computer system of FIG. 1, according to a preferred embodiment of the present invention;

DESCRIPTION OF THE PREFERRED EMBODIMENT

Figure 1:
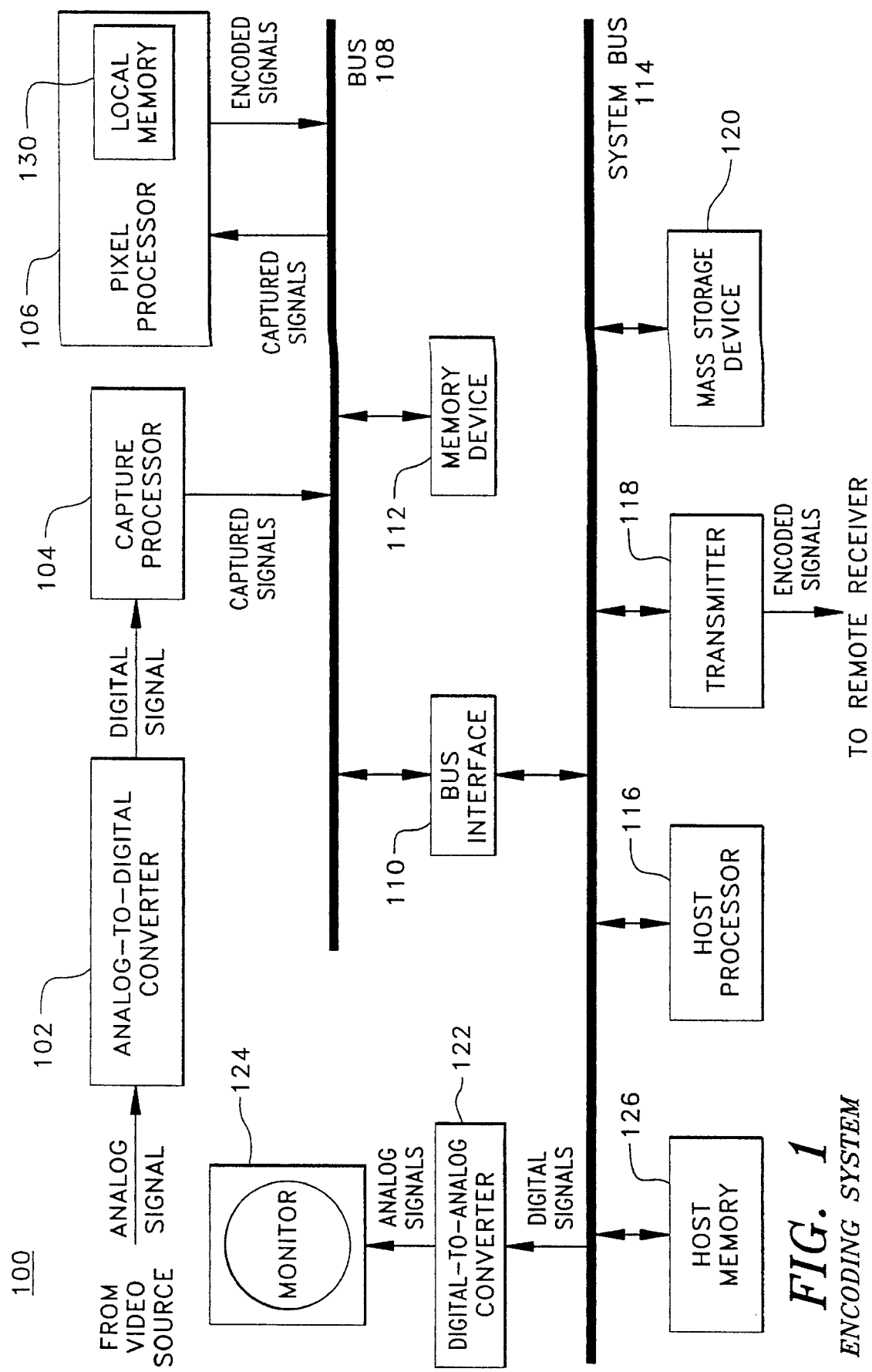
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
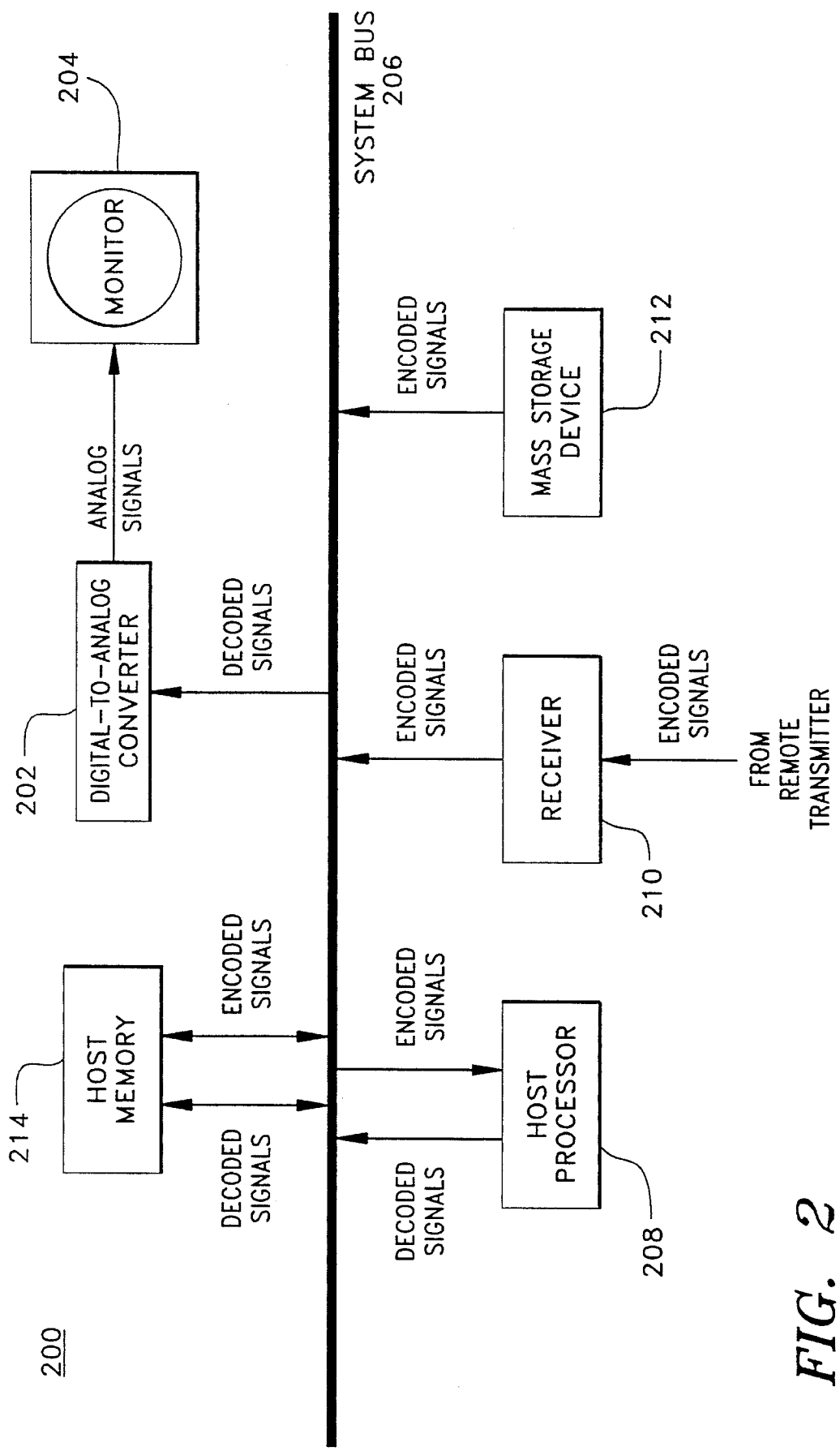
FIG. 2 is a computer-based decoding system for decoding the video signals encoded by the computer system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass/ storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system.

Monitor 204 may be any means for displaying analog image signals and is preferably a VGA monitor.

Referring now again to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of other video signals.

Referring now to FIG. 3, there are shown current frame 310 and search frame 311 stored in memory device 112. Current frame 310 and search frame 311 are two of the most recent video frame frames of a plurality of consecutive video frames. Current frame 310 is the current video frame being compressed, and search frame 311 is a previous video frame, preferably the immediately previous video frame, which is searched by a motion estimation procedure for block matches between search frame 311 and current frame 310. Current frame 310 contains reference block 302, and search frame 311 contains search block 304 and search area 305.

Reference and search frames 310 and 311 may be of any pixel size, and in a preferred embodiment have a size of (240×352) pixels, i.e. 240 rows×352 columns of pixels. When performing block matching operations for motion estimation, current frame 310 is divided into a number of smaller regions or blocks such as reference block 302. Reference block 302 (as well as search blocks such as search block 304) may be of various sizes and shapes. In a preferred embodiment, reference block 302 contains an 8×8 array of pixels. In an alternative preferred embodiment of the present invention, reference block 302 contains a (16×16) block of pixels. In further alternative preferred embodiments, reference block 302 contains, in general, (n×m) pixels, where n is the number of rows and m is the number of columns.

When performing block matching for purposes of motion estimation, reference block 302 is compared with various search blocks such as search block 304 of search frame 311, and the aforementioned comparison measurement which represents an indication of a degree of variation between a reference block 302 and a given search block 304 is determined. If this comparison value is sufficiently low, e.g. below a predetermined threshold value, a match is indicated. If a match is indicated, a motion vector which indicates the location of the matching search block 304 in search frame 311 as well as the location of reference block 302 in current frame 310, may be transmitted by pixel processor 106 to remote receiver 210. It will be appreciated that other data corresponding to current frame 310 may be transmitted as well, for example data compressed with other techniques that represent other blocks within current frame 310.

Since the decoding system of FIG. 2 should already have received previously-transmitted search frame 311 containing search block 304 (where search frame 311 may have itself been compressed and then decompressed), search block 304 from search frame 311 may be used with the transmitted motion vector to reproduce reference block 302 when decompressing current frame 310. It will be understood that if a lower threshold value is utilized in block matching, it will be more difficult to find a matching block, and the motion estimation procedure may take longer, but more accurate results may be obtained. By the same token, if a higher threshold value is utilized a "match" will likely be found more quickly but potentially less accurate results might be obtained. It will further be understood that if no match is found during the motion estimation process then reference block 302 might not be able to be reconstructed from a similar block from the previous search frame 311, and may therefore need to be transmitted (for example, after being compressed by other data compression methods such as discrete fourier transform, a discrete cosine transform, or a slant transform).

Given two blocks such as reference block 302 and search block 304 which are to be compared with each other to determine if there is a match, a comparison measurement is performed by encoding system 100. The basis of such comparison is often a standard calculation known as the "$L_1$ Norm" (i.e. the "absolute value of the difference" norm) which has the following form:

$$L_1 \text{ Norm} = \sum_{i=0}^{i=n} \sum_{j=0}^{j=m} |a_{ij} - b_{ij}|$$

where:

$a_{ij}$ is a value of a pixel in the ith row and jth column of search block 304;

$b_{ij}$ is a value of a pixel in the ith row and jth column of reference block 302;

n is the number of rows in a block; and m is the number of columns in a block.

It will be appreciated that the lower the difference indicated by the $L_1$ Norm calculation, the more similar are the reference and search blocks being compared. It will further be appreciated that the likelihood of finding a match increases if more search blocks are compared against reference block 302, i.e. if more comparison measurements are determined. For example, an exhaustive block matching comparison may be performed, where, for each reference block 302 within current frame 310, the $L_1$ Norm is calculated for every search block 304 within search frame 311, or at least until a "match" below a certain threshold is found.

It will be understood that the search blocks within search frame 311 may be displaced from each other by only one pixel horizontally or vertically and thus may overlap many neighboring search blocks by a substantial number of pixels. In such an exhaustive search, the first search block 304 may be chosen as the search block in the uppermost and left most corner of search frame 311, the next may be the search block one pixel displacement to the right of this block (which overlaps the previous search block to some extent), and so on until reference block 302 is exhaustively compared against each possible search block 304 within search frame 311.

Because such an exhaustive motion estimation procedure may be very computationally intensive, often the block matching performed by pixel processor 106 during the motion estimation procedure is performed on only a subset of possible search blocks within search frame 311. Because oftentimes a temporal correlation occurs between successive video frames such as search frame 311 and current frame 310, it is often statistically likely that any potential matches that exist will be found within a local region surrounding the location of reference block 302, perhaps even at the same location as reference block 302. The reason for this is that image features often will not move by very many pixels, if at all, from frame to frame. Therefore, a search area such as search area 305 may be selected as a subset of search frame 311. However, it will be understood that search area 305 may be as large as search frame 311 itself. When, for example, an exhaustive block matching comparison is performed by comparing a reference block 302 to each search block 304 within search frame 311, search area 305 may be considered to be equal to the entire search frame 311. In a preferred embodiment, search area 305 is a proper subset of search frame 311 and any given search block 304 is selected from search area 305, thus yielding a smaller possible number of search blocks, and consequently a smaller number of $L_1$ Norm measurements and related determinations and computations that must be performed. Those skilled in the art will appreciate that search area 305 may be (in alternative preferred embodiments) of any generalized size (p×q), to contain a selected number of search blocks 304.

Figure 4A:
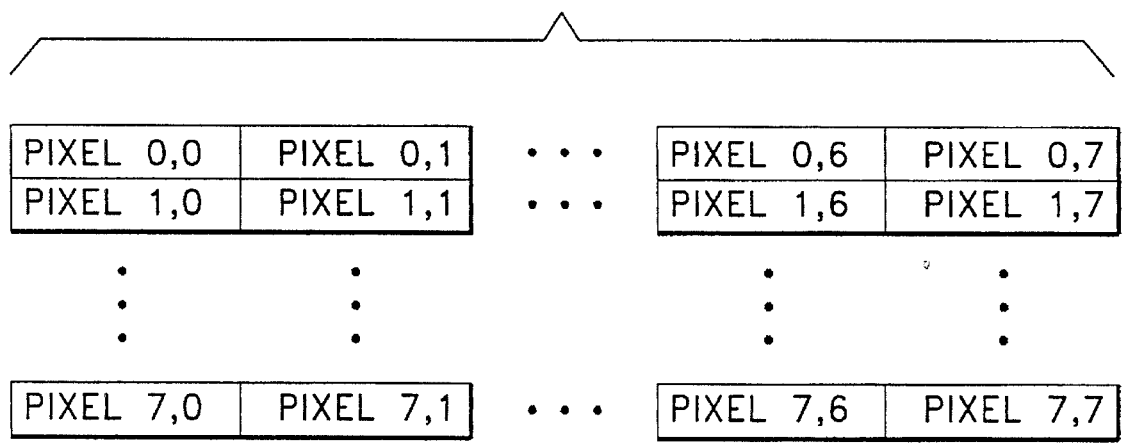
FIGS. 4A and 4B illustrate the ordering of pixels within the search block of FIG. 3, and the ordering of search blocks within the search frame of FIG. 3, respectively.
Figure 4B:
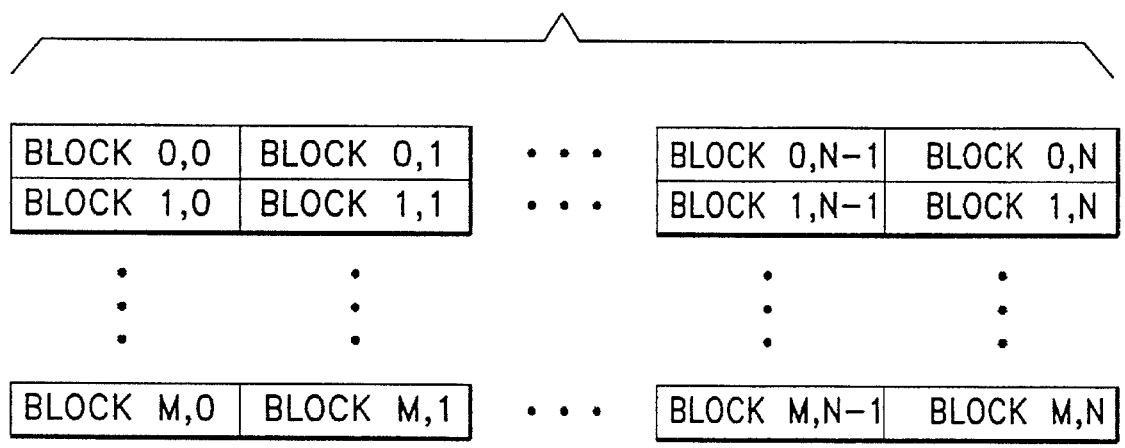

Referring now to FIGS. 4A and 4B, there is illustrated the ordering of pixels within search block 304 and the ordering of search blocks such as search block 304 within search frame 311. As shown in FIG. 4A, a given pixel i,j of an (8×8) search block 304 is located at the ith row and jth column of the block. Thus, pixel 0,0 is located in the upper left corner of search block 304 while pixel 0,7 is located in the upper right corner of search block 304. FIG. 4B shows the ordering of possible search blocks 304 within search frame 311, which are labelled in a manner similar to the pixels of FIG. 4A, where there are (M×N) search blocks within search frame 311.

It will be appreciated that calculations other than the above-described "$L_1$ Norm" may be utilized to perform comparison measurements between reference and search blocks. For example, an "$L_2$ Norm" (i.e. the "square of the absolute value of the difference" norm) has the following form:

$$L_2 \text{ Norm} = \sum_{i=0}^{i=n} \sum_{j=0}^{j=m} (a_{ij} - b_{ij})^2.$$

The above-described norms ($L_1$, and $L_2$) are useful for block matching comparisons, but a serious potential flaw exists with regard to their use for that purpose. When the displayed scene "fades," or when the scene "brightens" relatively uniformly, these norms will typically all produce indications of poor block comparisons for scenes that have essentially the same content except for being a little brighter or darker. As a result, few, if any, of the comparisons will fall below the specified threshold, and so, little, if any, useful compressions will occur. The problem is that while the spatial mid-frequency and high-frequency contents of the scenes are essentially the same (and would produce close block matching), the average brightness levels (i.e. the spatial "DC" levels) are much different.

It is much easier to encode information of low spatial frequency than information of high spatial frequency. Consequently, in order to make the most efficient use of the bits available for encoding a video sequence, it is more important to match the high spatial frequencies when using motion-compensation.

The Applicant has discovered an invention that comprises an improved technique for doing block matching that substantially eliminates the above-described problem. The invention comprises subtracting a constant value, for example the "DC" level (i.e. average value), of the pixel values in a block of pixels from each pixel value in the block before doing comparisons. (Multiplying each pixel value by a fractional constant would also work, but, of course, with somewhat different results.)

The following example will demonstrate the elegant simplicity and usefulness of Applicant's invention: Consider comparing two 2×2 pixel blocks with brightness values as follows:

$$\text{Block } A = \begin{vmatrix} a_{00} & a_{01} \\ a_{10} & a_{11} \end{vmatrix} = \begin{vmatrix} 4 & 0 \\ 1 & 3 \end{vmatrix}$$

$$\text{Block } B = \begin{vmatrix} b_{00} & b_{01} \\ b_{10} & b_{11} \end{vmatrix} = \begin{vmatrix} 11 & 5 \\ 7 & 9 \end{vmatrix}$$

These blocks represent a situation wherein the overall brightness level in block "B" is higher than that of block "A", but the spatial high frequency content of each block is quite similar. In other words, these blocks match quite closely except for the fact that block B is brighter overall that block A. Using norms $L_1$, and $L_2$ to compare the two blocks would indicate a large "error" measurement (i.e. poor matching) for the two blocks. Specifically, $$L_1 = |4-11|+|0-5|+|1-7|+|3-9|=+24$$

and $$L_2 = (4-11)^2+(0-5)^2+(1-7)^2+(3-9)^2=+146$$

So, in each case, these norms would indicate relatively large variations between Block A and Block B which would likely exceed a chosen error threshold level and result in a "no match" determination. On the other hand, the use of the average value of the pixel values in a block for the constant being subtracted employing Applicant's novel technique would result in "good match" determinations as follows:

$$\text{Average Value of Block } A = \bar{a} = \frac{a_{00} + a_{01} + a_{10} + a_{11}}{4}$$

$$= \frac{4+0+1+3}{4} = 2$$

$$\text{Average Value of Block } B = \bar{b} = \frac{b_{00} + b_{01} + b_{10} + b_{11}}{4}$$

$$= \frac{11+5+7+9}{4} = 8$$

-continued $$\text{So, Block } A^* = \begin{vmatrix} (a_{00} - \bar{a}) & (a_{01} - \bar{a}) \\ (a_{10} - \bar{a}) & (a_{11} - \bar{a}) \end{vmatrix} = \begin{vmatrix} +2 & -2 \\ -1 & +1 \end{vmatrix}$$

$$\text{and Block } B^* = \begin{vmatrix} (b_{00} - \bar{b}) & (b_{01} - \bar{b}) \\ (b_{10} - \bar{b}) & (b_{11} - \bar{b}) \end{vmatrix} = \begin{vmatrix} +3 & -3 \\ -1 & +1 \end{vmatrix}$$

Now, in accordance with Applicant's technique, Blocks $A^*$ and $B^*$ are compared according to norms $L_1$ and $L_2$, yielding the following results:

$$L_1^* = |2-3|+|-2-(-3)|+|-1-(-1)|+|1-1|=+2$$

and, $$L_1^* = (2-3)^2+(-2-(-3))^2+(-1-(-1))^2-(1-1)^2=+2$$

Another way of expressing Blocks $A^*$ and $B^*$ is as follows:

$$A^* = \begin{vmatrix} a_{00}^* & a_{01}^* \\ a_{10}^* & a_{11} \end{vmatrix} \text{ and } B^* = \begin{vmatrix} b_{00}^* & b_{01}^* \\ b_{10}^* & b_{11} \end{vmatrix}$$

[wherein $a_{00}^* = (a_{00} - \bar{a})$, etc.]

Novel norms $L_1^*$ and $L_2^*$ are hereby designated as the respective "AC" (i.e. alternating current) values of norms $L_1$, and $L_2$. This terminology is used to correspond with the commonly-used electrical engineering terminology with respect to Fourier analysis. It simply refers to an analogous idea of expressing a Fourier series without the non-sinusoidal (i.e. "DC") first term being included.

When a good "AC" match is found to exist between two blocks, the blocks are considered to match. Hence, pointer vector data can be sent to show the new location of the old (i.e. previously transmitted) block of data without having to resend the entire block of data. Along with the pointer vector data, data representing the change in average value between the new block and the old block is also sent so that the new block can be accurately reconstructed at the receiving end.

Applicant's technique provides for much-improved compression levels resulting from the application of motion estimation as compared with the prior-art methods. Applicant's invention is especially useful in situations where fades occur under natural changes of illumination, particularly with cameras having automatic irises or other types of automatic exposure control.

It is to be understood that many additional embodiments will be apparent to those skilled in the art such as employing a "root mean square" error term, or a "mean absolute" error term, e.g.:

The total square AC error is defined as:

$$\begin{aligned}
TSAE &= \Sigma (x - Mx - y + My)^2 \\
&= \Sigma (x - y)^2 + \Sigma (Mx)^2 - \\
&\quad 2MxMy + (My)^2 - 2xMx + \\
&\quad 2xMy + 2yMx - 2yMy) \\
&= \Sigma (x - y)^2 + N(Mx)^2\, 2NMxMy + \\
&\quad N(My)^2 - 2N(Mx)^2 + 2NMxMy + \\
&\quad 2NMyMx - 2NMyMy) \\
&= \Sigma (x - y)^2 - N(Mx)^2 + \\
&\quad 2NMxMy - N(My)^2 \\
&= \Sigma (x - y)^2 - N(Mx - My)^2 \\
&= \Sigma (x - y)^2 - (\Sigma x - \Sigma y)^2/N
\end{aligned}$$

The mean square AC error is defined as:

$$MSAE = TSAE/N = \frac{N\Sigma (x - y)^2 - (\Sigma x - \Sigma y)^2}{N^2}$$

The root mean square AC error is defined as:

$$RMSAE = \sqrt{MSAE} = \frac{\sqrt{(N\Sigma (x - y)^2 - (\Sigma x - \Sigma y)^2)}}{N}$$

where, x means $x_i$, y means $y_i$, Mx=mean of x
My=mean of y
N=total number of pixels in a block
x=pixel values in current block
y=pixel values in search block, and $\Sigma$ means $$\sum_{i=1}^{N} .$$

Also, using hue values instead of or in addition to brightness values to do block matching can be done without departing from the scope of Applicant's invention, which is defined by the following claims and their fair equivalents.

What is claimed is:

1. In a motion-estimation digital video image compression system, a computer-implemented method for video pixel block matching, comprising the steps of:

(A) subtracting a first constant value from each pixel value in a first block of pixel values, thus creating a second block of pixel values;

(B) subtracting a second constant value from each pixel value in a third block of pixel values, thus creating a fourth block of pixel values;

(C) comparing said second and fourth blocks of pixel values in accordance with a predetermined comparison norm, thus producing a comparison norm value; and (D) comparing said comparison norm value with a preset threshold value to determine whether said first and third blocks of pixels are well-matched.

2. The method of claim 1, wherein each of said first and second constant values are determined by calculating the average values of the pixels of said first and third blocks of pixel values respectively.

3. The method of claim 1, wherein each of said first and second constant values are determined by calculating the root-mean-square values of said first and third blocks of pixel values respectively.

4. The method of claim 1, wherein said predetermined comparison norm is a standard norm.

5. The method of claim 4 wherein said standard norm is the $L_1$ norm.

6. The method of claim 4 wherein said standard norm is the $L_2$ norm.

7. In a motion-estimation digital video image compression system, a computer-implemented method for video pixel block matching, comprising the steps of:

(A) multiplying a first fractional constant value times each pixel value in a first block of pixel values, thus creating a second block of pixel values;

(B) multiplying a second fractional constant value times each pixel value in a third block of pixel values, thus creating a fourth block of pixel values;

(C) comparing said second and fourth blocks of pixel values in accordance with a predetermined comparison norm, thus producing a comparison norm value; and (D) comparing said comparison norm value with a preset threshold value to determine whether said first and third blocks of pixels are well-matched.

8. The method of claim 7 including, before performing step (c), adding a third constant to each value in said second block of pixel values, and adding a fourth constant to each value in said fourth block of pixel values.

9. The method of claim 7 wherein each of said fractional constants is determined by respectively dividing the average value of the pixel values of a respective block by the highest peak pixel value in that block.

10. The method of claim 7 wherein each of said fractional constants is determined by respectively dividing the root-mean-square value of the pixel values of a block by the highest peak pixel value in that block.

11. The method of claim 7, wherein said predetermined comparison norm is a standard norm.

12. The method of claim 11 wherein said standard norm is the $L_1$ norm.

13. The method of claim 11 wherein said standard norm is the $L_2$ norm.

14. In a motion-estimation digital video image compression system, apparatus for video pixel block matching, comprising:

(A) means for subtracting a first constant value from each pixel value in a first block of pixel values, thus creating a second block of pixel values;

(B) means for subtracting a second constant value from each pixel value in a third block of pixel values, thus creating a fourth block of pixel values;

(C) means for comparing said second and fourth blocks of pixel values in accordance with a predetermined comparison norm, thus producing a comparison norm value; and (D) means for comparing said comparison norm value with a preset threshold value to determine whether said first and third blocks of pixels are well-matched.

15. The apparatus of claim 14, wherein each of said first and second constant values are determined by means for calculating the average values of the pixels of said first and third blocks of pixel values respectively.

16. The apparatus of claim 14, wherein each of said first and second constant values are determined by means for calculating the root-mean-square values of said first and third blocks of pixel values respectively.

17. The apparatus of claim 14, wherein said predetermined comparison norm is a standard norm.

18. The apparatus of claim 17 wherein said standard norm is the $L_1$ norm.

19. The apparatus of claim 17 wherein said standard norm is the $L_2$ norm.

20. In a motion-estimation digital video image compression system, apparatus for video pixel block matching, comprising:

(A) means for multiplying a first fractional constant value times each pixel value in a first block of pixel values, thus creating a second block of pixel values;

(B) means for multiplying a second fractional constant value times each pixel value in a third block of pixel values, thus creating a fourth block of pixel values;

(C) means for comparing said second and fourth blocks of pixel values in accordance with a predetermined comparison norm, thus producing a comparison norm value; and (D) means for comparing said comparison norm value with a preset threshold value to determine whether said first and third blocks of pixels are well-matched.

21. The apparatus of claim 20, including means for adding a third constant to each value in said second block of pixel values, and means for adding a fourth constant to each value in said fourth block of pixel values.

22. The apparatus of claim 20 wherein each of said first and second fractional constants is determined by means for respectively dividing the average value of the pixel values of a respective block by the highest peak pixel value in that block.

23. The apparatus of claim 20 wherein each of said fractional constants is determined by means for respectively dividing the root-mean-square value of the pixel values of a respective block by the highest peak pixel value in that block.

24. The apparatus of claim 20, wherein said predetermined comparison norm is a standard norm.

25. The apparatus of claim 24 wherein said standard norm is the $L_1$ norm.

26. The apparatus of claim 24 wherein said standard norm is the $L_2$ norm.

* * * * *